United States Patent

Schreiber et al.

[11] Patent Number: 5,309,724
[45] Date of Patent: May 10, 1994

[54] SWITCHABLE HEAT EXCHANGER CONFIGURATION FOR AIR CYCLE COOLING APPARATUS

[75] Inventors: Melvin Schreiber, Roslyn; Richard Yurman, Bethpage, both of N.Y.

[73] Assignee: Grumman Aerospace Corporation, Bethpage, N.Y.

[21] Appl. No.: 945,709

[22] Filed: Sep. 16, 1992

[51] Int. Cl.⁵ .................................. F25B 9/00
[52] U.S. Cl. .......................... 62/87; 62/172; 62/402
[58] Field of Search .............. 62/86, 87, 172, 401, 62/402

[56] References Cited

U.S. PATENT DOCUMENTS

| | | | |
|---|---|---|---|
| 3,878,692 | 4/1975 | Steves | 62/402 |
| 4,312,191 | 1/1982 | Biagini | 62/172 |
| 4,553,407 | 11/1985 | Rannenberg | 62/402 |
| 5,086,625 | 2/1992 | Momose et al. | 62/172 |

Primary Examiner—Ronald C. Capossela
Attorney, Agent, or Firm—Pollock, Vande Sande & Priddy

[57] ABSTRACT

In a normal mode, a primary heat exchanger for heated bleed airflow is situated upstream of an aircraft air conditioner compressor. A secondary heat exchanger is located downstream of the compressor. In response to hot and humid environmental conditions, three-way switching valves reposition the primary heat exchanger downstream of the compressor. The result will be the reduction of heat exchange exit temperature, which translates into lower turbine inlet and outlet temperatures at satisfactory airflow rates.

7 Claims, 2 Drawing Sheets

SWITCHABLE HEAT EXCHANGER CONFIGURATION FOR AIR CYCLE COOLING APPARATUS

FIELD OF THE INVENTION

The present invention relates to air cycle cooling apparatus, and more particularly to a switchable heat exchanger arrangement therefor.

BACKGROUND OF THE INVENTION

Air cycle cooling apparatus is conventionally used in creating a cool airflow for military aircraft electronics, as well as for air conditioning a cockpit. New and upgraded aircraft require cooling airflows at much higher rates and at lower temperatures than previously. It is, therefore, advantageous to continually look for ways of changing existing cooling systems to meet these higher demands.

BRIEF DESCRIPTION OF THE PRESENT INVENTION

The present invention utilizes a switchable heat exchanger arrangement for a bootstrap air cycle apparatus. Preliminary investigations of the present invention indicate that it is possible to obtain lower air cycle turbine eidt temperatures for various design and off-design conditions. It has been analyzed that, for a typical situation, the present invention can lower turbine exit temperatures by more than 14° F. for a hot day ground static condition and by similar amounts for flight conditions.

By virtue of the present invention, a dual switchable heat exchange configuration is possible. In the first state, normal bootstrap operation occurs wherein a primary heat exchanger is located upstream of a compressor and a secondary heat exchange downstream. However, during high air cycle turbine exit temperature conditions and low compressor inlet temperatures, the configuration switches in a set of ducts and valves which reposition the primary heat exchanger downstream of the compressor, as an additional secondary heat exchanger.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
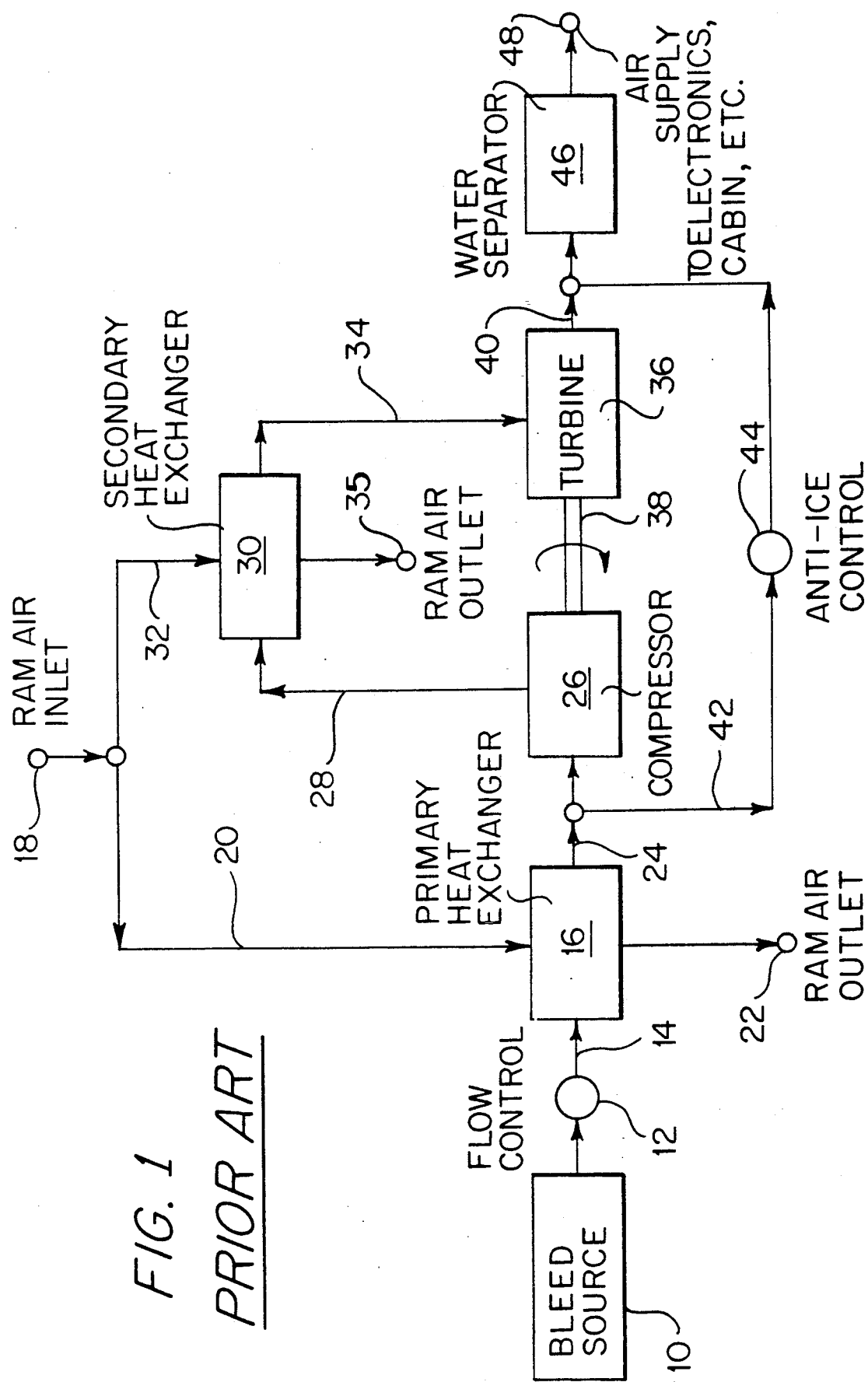
FIG. 1 is a block diagram of a prior art bootstrap air cycle configuration.

FIG. 1 illustrates a prior art bootstrap air cycle cooling system wherein a bleed source 10 provides inlet air, typically from a midstage of an aircraft engine. The bleed source may be raw or precooled engine bleed air. This air is generally subjected to a flow control valve 12 before being supplied to the primary heat exchanger. Cooling air is provided from a RAM air 18 to the primary heat exchanger 16 along line 20. The heated RAM air flow exits the primary heat exchanger 16 at outlet 22. The cooled bleed air exiting from primary heat exchanger 16 appears at the inlet of compressor 26. This compressor increases the pressure of the bleed air flow but this is accompanied by an increase of the airflow temperature. Thus, a second heat exchanger 30 is present at the outlet 28 of compressor 26. The RAM air inlet 18 supplies RAM air to the secondary heat exchanger 30 so that it provides cooling to the compressor discharge air, the result of which is indicated at the secondary heat exchanger outlet line 34. The RAM inlet air flowing through the secondary heat exchanger is dumped to an outlet 35. The cooled air from the secondary heat exchanger 30 is input to turbine 36 where it expands and accomplishes two functions. The first is to cool the air delivered to an outlet 40 of the turbine; and secondly, the expanding air causes rotation of the turbine shaft 38 which coaxially exists as the inlet shaft of compressor 26. Since the expanding air at the turbine outlet 40 contains condensate, a water separator 46 is provided for decreasing the humidity of the finally supplied air at system outlet 48. The air delivered at this outlet will cool electronic components as well as furnish air conditioning to a cockpit (not shown).

In order to ensure that the cooling system components at the outer stages do not freeze, a portion of the air flowing from the primary heat exchanger 16 is diverted along a parallel path 42 which includes an anti-ice valve control 44 which varies the flow through the parallel path as a function of sensed cold temperature at critical points.

Figure 3:
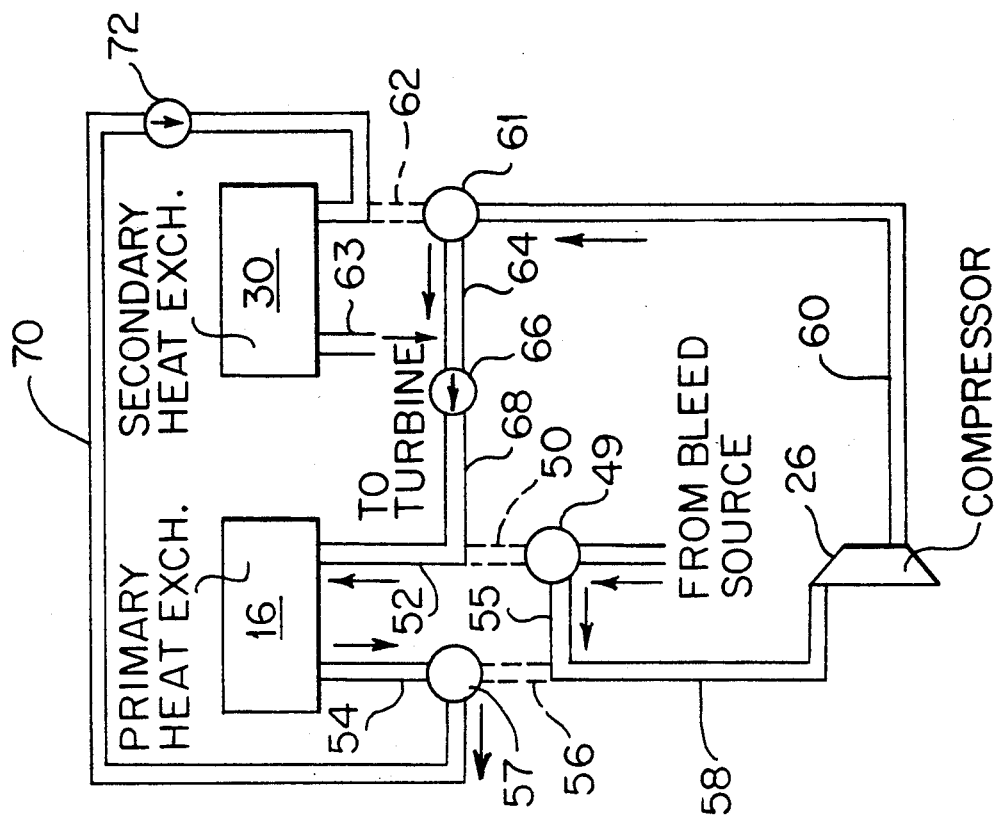
FIG. 3 is a block diagram of the system shown in FIG. 1 but in a switched or second state wherein the primary and secondary heat exchangers are repositioned in a bypass mode.
Figure 2:
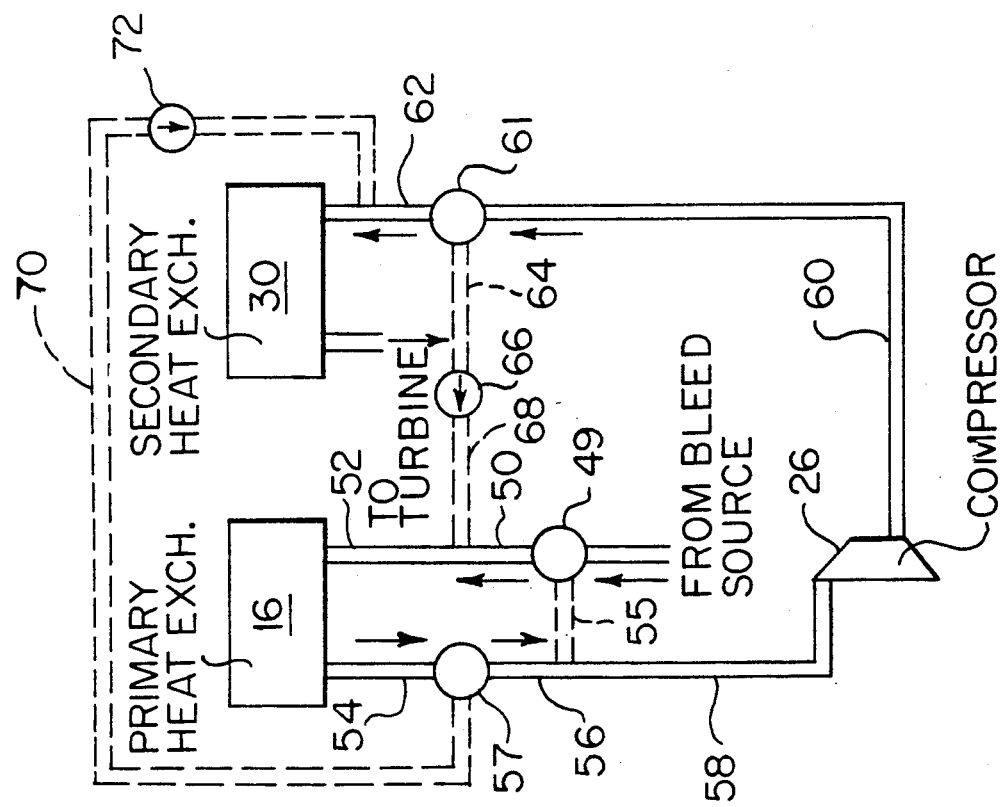
FIG. 2 is a block diagram of the present invention wherein ducts and valves maintain primary and secondary heat exchangers in a normal mode.

FIGS. 2 and 3 illustrate switchable states constituting the present invention including an alternate set of ducts, two check valves, and three three-way valves. During the normal mode shown in FIG. 2, the primary/secondary heat exchangers and compressor and turbine are positioned in the same locations relative to one another as was the case in the previously described prior art (FIG. 1). Thus, in the normal mode shown in FIG. 2, air is introduced into the system after a flow control valve such as 12 (FIG. 1). It then passes through a three-way valve 49 into ducts 50 and 52 which connect the incoming bleed source air with primary heat exchanger 16. Cooled air exits from the primary heat exchanger 16 through duct 54, three-way valve 57, and ducts 56 and 58. The air conditioner compressor 26 is connected downstream from the primary heat exchanger and upstream from the secondary heat exchanger 30. The connection is made through duct 60, three-way valve 61, and duct 62. The outlet flow from the secondary heat exchanger 30 is directed through duct 63 to the turbine.

In the bypass mode of FIG. 3, the three-way valves are switched so that both the primary and secondary heat exchangers are positioned downstream of the air conditioner compressor in series or parallel (FIG. 3 shows it in series). Switching the air cycle apparatus from the normal to the bypass mode is particularly appropriate for hot, humid ground static conditions and for in-flight hot day conditions. The actual switching of the three-way valves, as will be discussed in connection with FIG. 3, can be achieved by compressor inlet or discharge air temperature sensors which do not, per se, form the present invention. In order to achieve this, the three-way valve 49 closes off flow through duct 50 and opens the flow through duct 55 thereby immediately bypassing the bleed source intake to the compressor 26. The three-way valve 61 also switches the outlet flow from the compressor 26 to a duct 64, instead of duct 62, thereby delivering compressed airflow through a check valve 66 to the primary heat exchanger 16. A bypass loop is then created between the outlet of the primary heat exchanger 16 and the secondary heat exchanger 30. This occurs as a result of switching the three-way valve 57 so that bypass duct 70 directs the airflow from primary heat exchanger 16 to the inlet of the secondary heat exchanger 30, via checkvalve 72 instead of passing through now closed duct 56. The outlet of the secondary heat exchanger is connected to the turbine through duct 63 as is the case in the normal mode.

Accordingly, the utilization of the bypass mode improves performance in hot, humid conditions by ensuring colder turbine inlet and thus turbine discharge temperatures. This requires lower airflow rates from the bleed source and thus provides lower fuel consumption, or for the same flow rate provides more electronics and/or cabin cooling. As a result, the beneficial effect of lower cabin temperatures may be realized with lower airflow rates.

It should be understood that the invention is not limited to the exact details of construction shown and described herein for obvious modifications will occur to persons skilled in the art.

We claim:

1. An air cycle switching apparatus comprising:
   a bleed source of airflow;
   first and second heat exchangers for cooling the airflow;
   means for compressing the airflow; and
   valve means responsive to temperature for switching the position of the heat exchangers relative to an input of the compressing means wherein a first state of the valve means connects the first heat exchanger upstream of the compressing means while the second heat exchanger resides downstream thereof, and a second state wherein the first and second heat exchangers both exist downstream of the compressing means;
   turbine means having its intake connected to an outlet of the secondary heat exchanger; and
   means for delivering cooling airflow from an outlet of the turbine means to a utilization point, the airflow being finally cooled as a consequence of expansion in the turbine means.

2. The apparatus set forth in claim 1 wherein the valve means include:
   a first three-way valve selectively connecting the airflow from the bleed source to the
   (a) first heat exchanger in the first state, and
   (b) the intake of the compressing means in the second state;
   a second three-way valve selectively connecting airflow
   (c) from the outlet of the compressing means to an inlet of the second heat exchanger in the first state, and
   (d) an inlet of the first heat exchanger in the second state; and
   a third three-way valve directing airflow from an outlet of the first heat exchanger to
   (e) the compressing means during a first state, and
   (f) the inlet of the second heat exchanger in the second state.

3. The apparatus set forth in claim 2 together with a check valve in a duct connecting the second three-way valve to the inlet of the first heat exchanger.

4. The apparatus set forth in claim 2 together with a check valve in a duct connecting the third three-way valve to the inlet of the second heat exchanger.

5. A switchable air cycle cooling system for aircraft comprising:
   a source of airflow;
   first and second heat exchangers for cooling the airflow;
   means for compressing the airflow;
   valve means responsive to temperature for switching the position of the heat exchangers relative to an input of the compressing means wherein a first state of the valve means connects the first heat exchanger upstream of the compressing means while the second heat exchanger resides downstream thereof, and a second state wherein the first and second heat exchangers both exist downstream of the compressing means; turbine means having its intake connected to an outlet of the secondary heat exchanger; means for delivering cooling airflow from an outlet of the turbine means to a utilization point, the airflow being finally cooled as a consequence of expansion in the turbine means; wherein the valve means includes: a first three-way valve selectively connecting the airflow from the bleed source to the
   (a) first heat exchanger in the first state, and
   (b) the intake of the compressing means in the second state;
   a second three-way valve selectively connecting airflow
   (c) from the outlet of the compressing means to an inlet of the second heat exchanger in the first state, and
   (d) an inlet of the first heat exchanger in the second state; and
   a third three-way valve directing airflow from an outlet of the first heat exchanger to
   (e) the compressing means during a first state, and
   (f) the inlet of the second heat exchanger in the second state;
   a check valve in a duct connecting the second three-way valve to the inlet of the first heat exchanger; and
   a check valve in a duct connecting the third three-way valve to the inlet of the second heat exchanger.

6. A method for increasing the efficiency of an aircraft air cycle cooling system comprising the steps:
   bleeding a controlled airflow from an aircraft jet engine;
   normally cooling the airflow at a first heat exchange point;
   normally compressing the airflow thereby raising both its pressure and temperature;
   normally cooling the airflow at a second heat exchange point after compression;
   passing the cooled airflow to a turbine for expanding the airflow thereby further controlling it; and
   switching the airflow path to achieve compression prior to cooling at serially or parallel connected first and second heat exchange points prior to cooling expansion of the airflow in the turbine; and
   delivering the cooled expanded air to an aircraft cabin.

7. The method set forth in claim 6 together with the step of powering compression with energy derived from the expansion step.

* * * * *